United States Patent
Sakamoto et al.

(10) Patent No.: US 7,406,380 B2
(45) Date of Patent: Jul. 29, 2008

(54) NAVIGATION SYSTEM

(75) Inventors: Kiyomi Sakamoto, Ikoma (JP); Noboru Nomura, Kyoto (JP); Shinji Kubota, Daito (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 782 days.

(21) Appl. No.: 10/960,022

(22) Filed: Oct. 8, 2004

(65) Prior Publication Data

US 2005/0137795 A1 Jun. 23, 2005

Related U.S. Application Data

(63) Continuation of application No. 10/404,097, filed on Apr. 2, 2003, now Pat. No. 6,859,728.

(30) Foreign Application Priority Data

Apr. 3, 2002 (JP) ............... 2002-100964

(51) Int. Cl.
*G01C 21/34* (2006.01)
(52) U.S. Cl. ............... 701/211; 340/995.1; 340/995.27
(58) Field of Classification Search ................ 701/200, 701/208, 211, 23–25; 340/995.1, 995.27
See application file for complete search history.

(56) References Cited

U.S. PATENT DOCUMENTS 6,401,029 B1 * 6/2002 Kubota et al. ............... 701/201

6,859,728 B2 * 2/2005 Sakamoto et al. ........... 701/211
7,289,904 B2 * 10/2007 Uyeki ........................ 701/209
2003/0117298 A1 6/2003 Tokunaga et al.

FOREIGN PATENT DOCUMENTS

| JP | 6-076003 | 3/1994 |
|---|---|---|
| JP | 10-185603 | 7/1998 |
| JP | 11-183181 | 7/1999 |
| JP | 11-219500 | 8/1999 |
| JP | 2000-310535 | 7/2000 |
| JP | 2002-029383 | 1/2002 |

* cited by examiner

*Primary Examiner*—Yonel Beaulieu
(74) *Attorney, Agent, or Firm*—Weneroth, Lind & Ponack, L.L.P.

(57) ABSTRACT

A navigation system for providing different modes of navigation guidance to drivers is provided. A smart card stores user information. In a main apparatus, a parameter table storage section stores parameters which are used for controlling the outputting of navigation guidance to an entity. A control section acquires at least one parameter from the parameter table storage section based on the user information stored in the smart card, and thereafter generates information necessary for providing navigation guidance for the entity in accordance with the acquired parameter(s). A display section or an audio output section outputs various information generated by the control section.

22 Claims, 8 Drawing Sheets

PARAMETER TABLE STORAGE SECTION

33

TPM

|  | UNDER Y1 YEARS | Y1 YEARS OR OLDER |
|---|---|---|
| X-DIRECTION DISTANCE AND Y-DIRECTION DISTANCE | La1, Lb1 | La2(<La1), Lb2(<Lb1) |
| SOUND VOLUME | V1 | V2(>V1) |
| SWITCHING PERIOD | F1 | F2(<F1) |
| STIPULATED IMPORTANCE DEGREES | DL1(=BOTH) | DL2(=HIGH) |
| OUTPUTTING DISTANCE FOR INTERSECTION INFORMATION | TP1 | TP2(>TP2) |

✕ CAR ACCIDENT/FAILURE

NAVIGATION SYSTEM

This application is a continuation of U.S. application Ser. No. 10/404,097, filed Apr. 2, 2003, now U.S. Pat. No. 6,859,728.

BACKGROUND OF THE INVENTION

1. Field of the Invention

The present invention relates to a navigation system, and more particularly to a navigation system which is capable of utilizing user information which has been read from a storage medium.

2. Description of the Background Art

An example of a conventional navigation system which is mountable on a vehicle performs the following processes. The navigation system continuously checks the level of driving proficiency of the driver while the driver is driving the vehicle. Also during the driving of the vehicle, the navigation system sets a current location and the user's destination on a map, and then predicts the traffic situation within an area which is defined based on the current location and the destination which have been set. Thereafter, the navigation system determines an optimum route by taking the current traffic situation into consideration, and displays a map with the determined optimum route superimposed thereon. The driver, who will normally advance the vehicle in accordance with the determined optimum route, may occasionally desire to go on a different route (for reasons such as traffic congestion), in which case the driver instructs the navigation system so. In response to such an instruction, the navigation system will determine another route based on the level of driving proficiency of the driver and the current traffic situation, and further guide the driver in accordance with the newly determined route. Through this process, the navigation system guides the driver to the destination in accordance with optimum routes which have been determined based on the level of driving proficiency of the driver.

However, the conventional navigation system has a problem in that navigation guidance is given in the same manner irrespective of who the driver is. For example, intersection information is outputted with a fixed timing during navigation guidance to the driver, so that the conventional navigation system may not be able to give sufficient time for an elderly driver to become ready to turn at an intersection. Moreover, since the format of the displayed map is fixed, the conventional navigation system may provide elderly drivers with more information than they can handle.

SUMMARY OF THE INVENTION

Therefore, an object of the present invention is to provide a navigation system which is capable of providing different modes of navigation guidance depending on who the driver is.

The present invention has the following features to attain the object mentioned above.

A first aspect of the present invention is directed to a navigation system comprising: a storage medium for storing user information; a parameter storage section for storing one or more parameters used for controlling outputting of information necessary for providing navigation guidance for an entity; a parameter acquisition section for acquiring at least one parameter from the parameter storage section based on the user information stored in the storage medium; an information generation section for generating information necessary for providing the navigation guidance for the entity in accordance with the at least one parameter acquired by the parameter acquisition section; and an output section for outputting the information generated by the information output section.

In the first aspect, preferably, the storage medium is comprised in a smart card, and the parameter storage section, the parameter acquisition section, the information generation section, and the output section are comprised in a main apparatus.

In one embodiment, the entity is a vehicle, the smart card is an electronic driver's license for driving the vehicle, the user information stored in the storage medium is an age of a bearer of the electronic driver's license or a date of issue of the electronic driver's license, the parameter storage section stores one or more parameters for each of a number of predetermined ranges of age or length of driving career, and the parameter acquisition section acquires, from the parameter storage section, a set of parameters associated with the age stored in the storage medium or a driving career calculable from the date of issue stored in the storage medium.

Thus, according to the first aspect, one or more parameters to be used for controlling the outputting of information necessary for providing navigation guidance for the entity are stored for each of a number of predetermined ranges of age or length of driving career. Then, those parameters which are classified with reference to ranges of age or length of driving career are acquired in accordance with the age stored in the storage medium or a length of driving career calculable from the date of issue stored in the storage medium. In accordance with the acquired parameter(s), information necessary for providing navigation guidance for the entity is generated and outputted. Thus, a navigation system can be realized which is capable of providing different modes of navigation guidance, especially that which is very helpful to elderly people, depending on who the driver is.

In the first aspect, the navigation system further comprises a cartographic data storage section for storing a plurality of objects and road network data necessary for drawing a map image which is substantially rectangular-shaped, the road network data representing interconnections between roads on a map. The parameter storage section stores, for each of the number of predetermined ranges of age or length of driving career, a combination of X-direction and Y-direction distances in the map image to be drawn, and the parameter acquisition section acquires, from the parameter storage section, a combination of X-direction and Y-direction distances associated with the age stored in the storage medium or a length of driving career calculable from the date of issue stored in the storage medium. The information generation section comprises an object/road network data acquisition section for acquiring, from the cartographic data storage section, necessary objects and road network data for the combination of X-direction and Y-direction distances acquired by the parameter acquisition section; and a map image generation section for generating a map image by using the objects and road network data acquired by the object/road network data acquisition section, wherein the information output section outputs the map image generated by the map image generation section as information.

In the first aspect, the cartographic data storage section further stores, for each of a number of predetermined degrees of importance, information superimposable on the map image to be drawn. The parameter storage section further stores, for each of the number of predetermined ranges of age or length of driving career, a degree of importance assigned to information to be superimposed on the map image to be drawn. The parameter acquisition section further acquires, from the parameter storage section, a degree of importance associated with the age stored in the storage medium or a length of driving career calculable from the date of issue stored in the storage medium. The information generation section further comprises an information acquisition section for acquiring, from the cartographic data storage section, information associated with the degree of importance acquired by the parameter acquisition section, and the map image generation section generates the map image by further using the information acquired by the information acquisition section.

In the first aspect, the navigation system further comprises a traffic information receiving section for receiving traffic information representing a current traffic situation in the road network, wherein, the parameter storage section stores, for each of the number of predetermined ranges of age or length of driving career, a switching period for switching the traffic information received by the traffic information receiving section. The parameter acquisition section acquires, from the parameter storage section, a switching period associated with the age stored in the storage medium or a length of driving career calculable from the date of issue stored in the storage medium. The information generation section comprises a display timing determination section for determining whether a time to display information has been reached or not based on the switching period acquired by the parameter acquisition section, and if the display timing determination section determines that the time to display information has been reached, the information output section displays the traffic information received by the traffic information receiving section as information.

In the first aspect, the navigation system further comprises: a cartographic data storage section for at least storing road network data representing interconnections between roads on a map, a route search section for searching for a route from a designated start point to a designated end point by using the road network data stored in the cartographic data storage section. The parameter storage section further stores, for each of the number of predetermined ranges of age or length of driving career, a sound volume level at which to provide a voice navigation guidance for the entity in accordance with the route searched for by the route search section, and an outputting distance at which the voice guidance is outputted, and the parameter acquisition section further acquires, from the parameter storage section, a sound volume level and an outputting distance associated with the age stored in the storage medium or a length of driving career calculable from the date of issue stored in the storage medium. The information generation section comprises a voice guidance determination section for determining whether a time to output the voice guidance has been reached or not based on the outputting distance acquired by the parameter acquisition section, and a voice guidance generation section for generating the voice guidance when the voice guidance determination section determines that the time to output the voice guidance has been reached, wherein the information output section outputs the voice guidance generated by the voice guidance generation section as information in accordance with the sound volume level acquired by the parameter acquisition section.

A second aspect of the present invention is directed to a navigation method for providing navigation guidance for an entity, by using user information and one or more parameters used for controlling outputting of information necessary for providing the navigation guidance, comprising: a user information acquisition step of acquiring user information; a parameter acquisition step of acquiring at least one parameter based on the user information acquired by the user information acquisition step; an information generation step of generating information necessary for providing the navigation guidance for the entity in accordance with the at least one parameter acquired by the parameter acquisition step; and an outputting step of outputting information generated by the information outputting step.

The method according to the second aspect may be implemented by a computer program. Such a computer program may be recorded in a storage medium.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
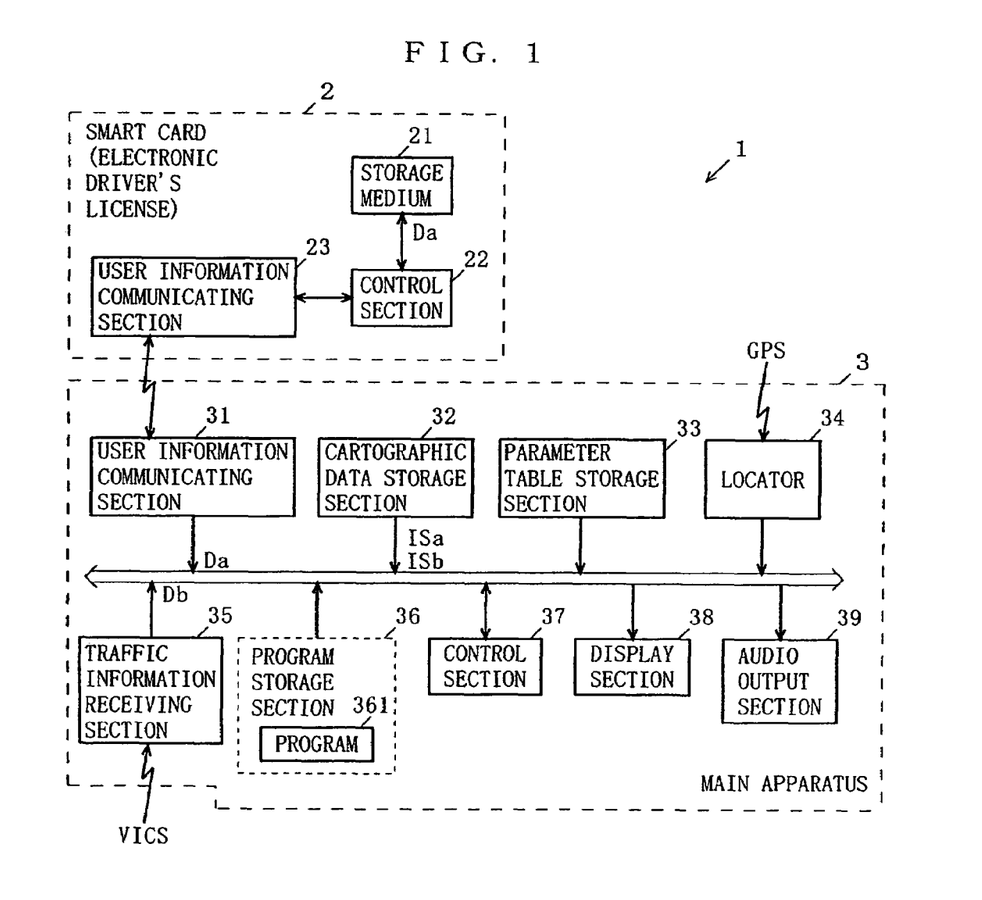
FIG. 1 is a block diagram illustrating the structure of a navigation system 1 according to an embodiment of the present invention.

FIG. 1 is a block diagram illustrating the structure of a navigation system 1 according to an embodiment of the present invention. In FIG. 1, the navigation system 1 comprises a smart card 2 which is capable of storing information concerning the bearer of the smart card 2, and a main apparatus 3 for providing navigation guidance to a vehicle, for example, by using the information stored in the smart card 2.

The smart card 2, which is preferably a driver's license in an electronic form (hereinafter referred to as an "electronic driver's license"), comprises a storage medium 21, a control section 22, and a user information communicating section 23. In the present embodiment, the term "smart card" is used synonymously with the term "IC (Integrated Circuit) card".

Figure 2:
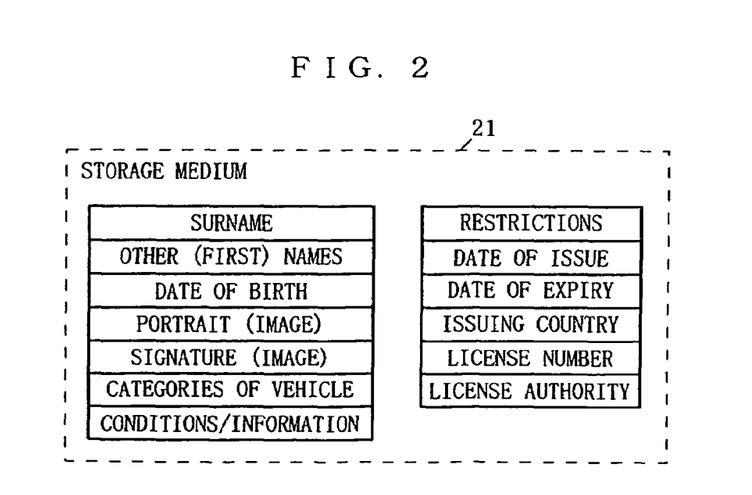
FIG. 2 is a schematic diagram illustrating information which is stored in a storage medium 21 shown in FIG. 1.

As shown in FIG. 2, the storage medium 21 stores information concerning the bearer (i.e., a person who has been given permission by the authority to drive a given vehicle) of the smart card 2, such as the bearer's surname, other (first)

names, date of birth, portrait image, signature image, categories of vehicles which the bearer is permitted to drive, conditions/information concerning the driving by the driver, and restrictions concerning the driving by the driver. Furthermore, the storage medium 21 stores a date of issue, a date of expiry, an issuing country, a license number, and a license authority with respect to the electronic driver's license. The smart card 2 is preferably constructed in such a manner that the information within the storage medium 21 can be edited by no one but the appropriate authority.

Referring back to FIG. 1, in response to a request from the main apparatus 3, the control section 22 in the smart card 2 reads the "date of birth" from the storage medium 21 as an instance of user information Da.

The user information communicating section 23 transmits the user information Da having been read by the control section 22 to the main apparatus 3.

The main apparatus 3, which is typically installed in a vehicle, comprises a user information communicating section 31, a cartographic data storage section 32, a parameter table storage section 33, a locator 34, a traffic information receiving section 35, a program storage section 36, a control section 37, and a display section 38 and an audio output section 39 (as a typical example of an output section).

The user information communicating section 31 receives the user information Da which is transmitted from the smart card 2 borne by the driver of the vehicle. Note that, in addition to the driver, it may also be possible for another person to be in the vehicle, and such a person may also bear his/her own smart card 2. In order to cope with such a situation, the user information communicating section 31 of the main apparatus 3 is disposed in a position which is closer to the driver's seat than any other seat within the vehicle, so that the user information communicating section 31 can only receive the user information Da from the driver's smart card 2. Once disposed in such a position, the user information communicating section 31 will conduct wireless communications with one of the plurality of smart cards 2 present around itself that gives the strongest received signal, i.e., the smart card 2 borne by the driver of the vehicle sitting at the driver's seat, thereby receiving the user information Da therefrom.

Figure 3:
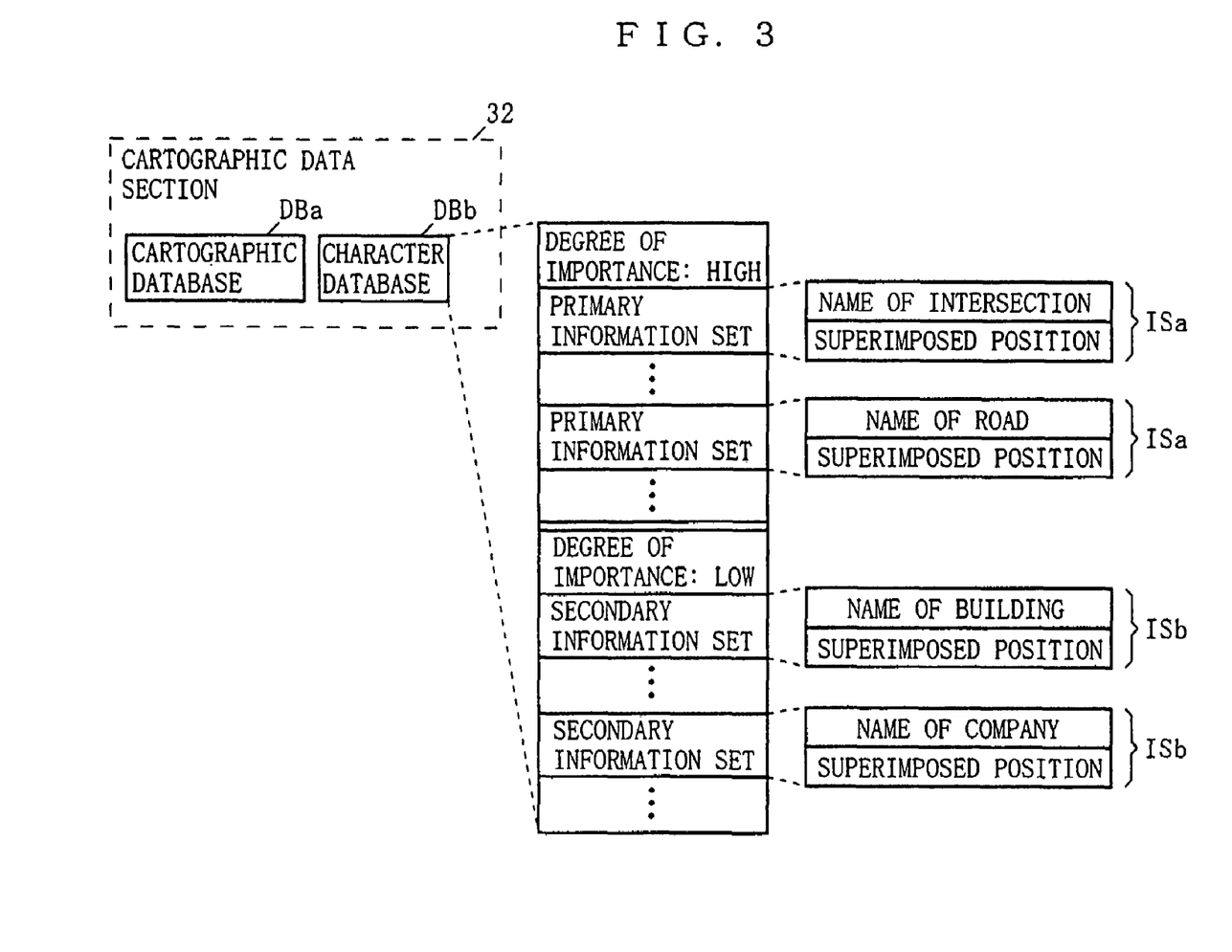
FIG. 3 is a schematic diagram illustrating data stored in a cartographic data storage section 32 shown in FIG. 1.

The cartographic data storage section 32 is a device which is at least capable of reading the information written in an internal recording medium. As shown in FIG. 3, the cartographic data storage section 32 stores a cartographic database DBa and a character database DBb. The cartographic database DBa stores a data set composed of a plurality of objects necessary for drawing a map image, and road network data representing how the roads on the map are interconnected, which is necessary for the drawing of the map image and performing a route search. The cartographic database DBa can be of a well-known type, and therefore any detailed description thereof will be omitted.

The character database DBb is a set of text strings each of which can be superimposed on the map image. More specifically, the character database DBb contains at least one primary information set ISa and at least one secondary information set ISb. Each primary information set ISa contains text having a high degree of importance to the map image (i.e., names of intersections and names of roads in the illustrated example) and a position to superimpose (hereinafter referred to as the "superimposed position") each piece of such text. Each secondary information set ISb contains text having a low degree of importance to the map image (i.e., names of buildings and names of companies in the illustrated example) and the superimposed position for each piece of such text. The superimposed position represents where on the map image to superimpose a corresponding piece of text contained in the same primary information set ISa or secondary information set ISb, e.g., in terms of latitude and longitude.

On a conventional map image, various text, e.g., names of intersections, names of roads, names of buildings, and names of companies are superimposed. However, a map image on which an excessive amount of text is superimposed is not necessarily very helpful to elderly people. Rather, elderly people may find a map image having only essential text for the navigation guidance superimposed thereon to be even more preferable. On the other hand, it is conceivable that younger generations of people might enjoy map images with generous text superimpositions thereon. The degree of importance of a given piece of text may be determined from the above perspective. In other words, names of intersections and names of roads, which constitute essential information for the navigation guidance irrespective of whether the driver is an elderly person or a younger person, may be assigned with a higher degree of importance. On the other hand, names of buildings and names of companies presumably play only auxiliary roles in the navigation guidance, and therefore have a lower degree of importance than that of the names of intersections and names of roads. Thus, since there will be little need for superimposing names of buildings and names of companies on a map image which is intended for elderly people, the names of buildings and names of companies may be assigned with a lower degree of importance.

Figure 4:
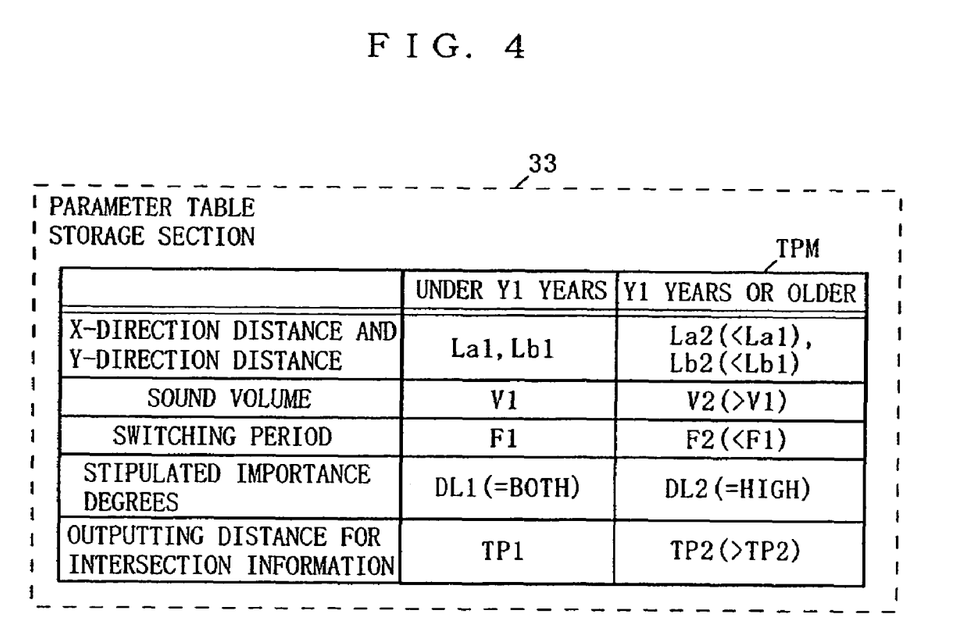
FIG. 4 is a schematic diagram illustrating parameters stored in a parameter table storage section 33 shown in FIG. 1.

Referring back to FIG. 1, the parameter table storage section 33 is a device that is capable of reading information which is recorded on an internal recording medium, and may typically be implemented by the same device used for implementing the cartographic data storage section 32. As shown in FIG. 4, the parameter table storage section 33 stores a parameter table TPM, which describes parameters that are necessary for the navigation guidance to be provided for the vehicle. In FIG. 4, the parameter table TPM describes: a combination of an X-direction distance La1 and a Y-direction distance Lb1 to be applied for drivers who are under a threshold age Y1; a sound volume level V1; a switching period F1; a stipulated importance degree DL1; and an outputting distance TP1 associated with the outputting of intersection information. The parameter table TPM also describes: a combination of an X-direction distance La2 and a Y-direction distance Lb2 to be applied for drivers who are equal to or older than the threshold age Y1; a sound volume level V2; a switching period F2; a stipulated importance degree DL2; and an outputting distance TP2 associated with the outputting of intersection information.

The threshold age Y1 used in the parameter table TPM above is a value by which to determine whether a driver is an elderly person or not.

Figure 5:
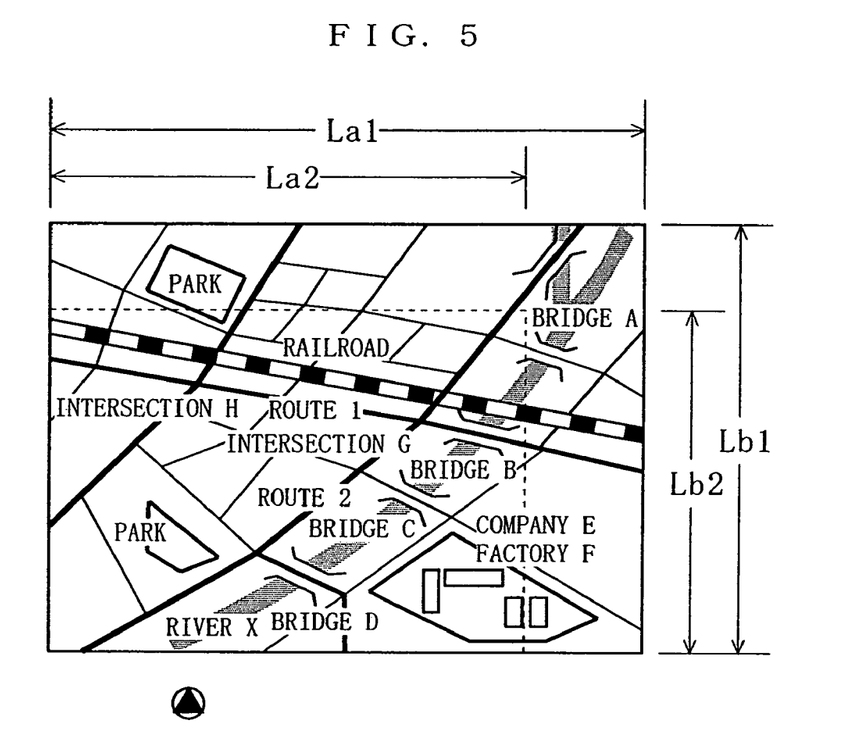
FIG. 5 is a schematic diagram illustrating combinations of X-direction distances and Y-direction distances shown in FIG. 4.

Each of the combination of an X-direction distance La1 and a Y-direction distance Lb1 and the combination of an X-direction distance La2 and a Y-direction distance Lb2 is a set of values specifying actual physical distances of the two dimensions of a map to be generated by the main apparatus 3. The value of the X-direction distance La2 is set to be smaller than that of the X-direction distance La1. The value of the Y-direction distance Lb2 is set to be smaller than that of the Y-direction distance Lb1. For instance, referring to FIG. 5, assuming that the Y-direction distance Lb1 is 400 m and the X-direction distance La1 is 480 m, the Y-direction distance Lb2 may be 320 m and the X-direction distance La2 may be 384 m, for example (see the area within dotted lines).

The sound volume levels V1 and V2 each indicate the sound volume level of the audio (e.g., synthesized voices)

outputted from the audio output section 39. The value of the sound volume level V2 is set to be greater than that of the sound volume level V1.

The switching periods F1 and F2 each indicate a value representing the time to display traffic information Db (described later) received by the traffic information receiving section 35, and more specifically is a time interval with which to display the traffic information Db. The value of the switching period F2 is set to be greater than that of the switching period F1.

The stipulated importance degrees DL1 and DL2 each indicate a degree of importance above which a given piece of text is superimposed on a map image. The stipulated importance degree DL1 indicates that text having either a "high" or "low" degree of importance is to be superimposed. The stipulated importance degree DL2 indicates that only text having a "high" degree of importance is to be superimposed.

As will be described later, the main apparatus 3 outputs a voice guidance which directs the driver to "go straight", "turn right at", or "turn left at" the next intersection when the vehicle reaches a predetermined distance from an intersection which the vehicle is currently approaching. The outputting distances TP1 and TP2 each indicate a point at which to output such a voice guidance, the point being expressed in terms of a distance measured from the intersection which the vehicle is currently approaching. The value of the outputting distance TP2 is set to be greater than that of the outputting distance TP1.

Referring back to FIG. 1, the locator 34 encompasses a receiver and/or autonomous navigation sensors of an external positioning system (typically, the GPS (Global Positioning System)). A GPS receiver, by using information received from the external positioning system, regularly outputs to the control section 37 a current location of the vehicle which is expressed in terms of latitude and longitude. The autonomous navigation sensors would typically include a velocity sensor and a gyrocompass, which regularly detect the velocity and direction of movement of a user and output such information to the control section 37.

Figure 6:
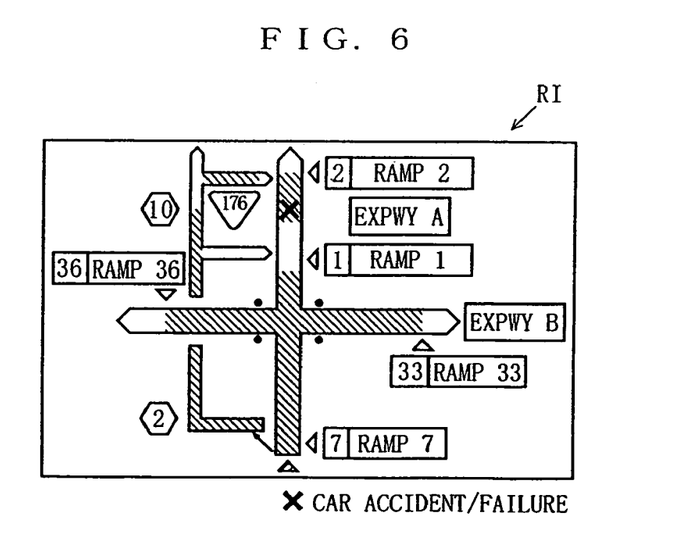
FIG. 6 is a schematic diagram illustrating a traffic regulation image RI contained in traffic information Db which is received by a traffic information receiving section 35 shown in FIG. 1.

The traffic information receiving section 35 typically receives traffic information Db which is regularly sent from the VICS (Vehicle Information Communication System), and stores it to a RAM in the control section 37. While the VICS is capable of providing various traffic information Db to describe the current traffic situation on a road network, the present embodiment assumes that, as shown in FIG. 6, the traffic information Db includes a traffic regulation image RI indicating a point of traffic regulation which is implemented as a result of a traffic accident.

The program storage section 36, which is typically composed of a ROM (Read Only Memory), stores a computer program (hereinafter simply referred to as a "program") 361 that describes a processing procedure by which the main apparatus 3 provides navigation guidance.

The control section 37, which is typically composed of a CPU (Central Processing Unit) and a RAM (Random Access Memory), performs necessary processing for providing the navigation guidance in accordance with the program 361.

The display section 38 displays various images which are generated by the control section 37. The audio output section 39 outputs various synthesized voices which are generated by the control section 37 at the sound volume level V1 or V2 as set by the control section 37.

Figure 7:
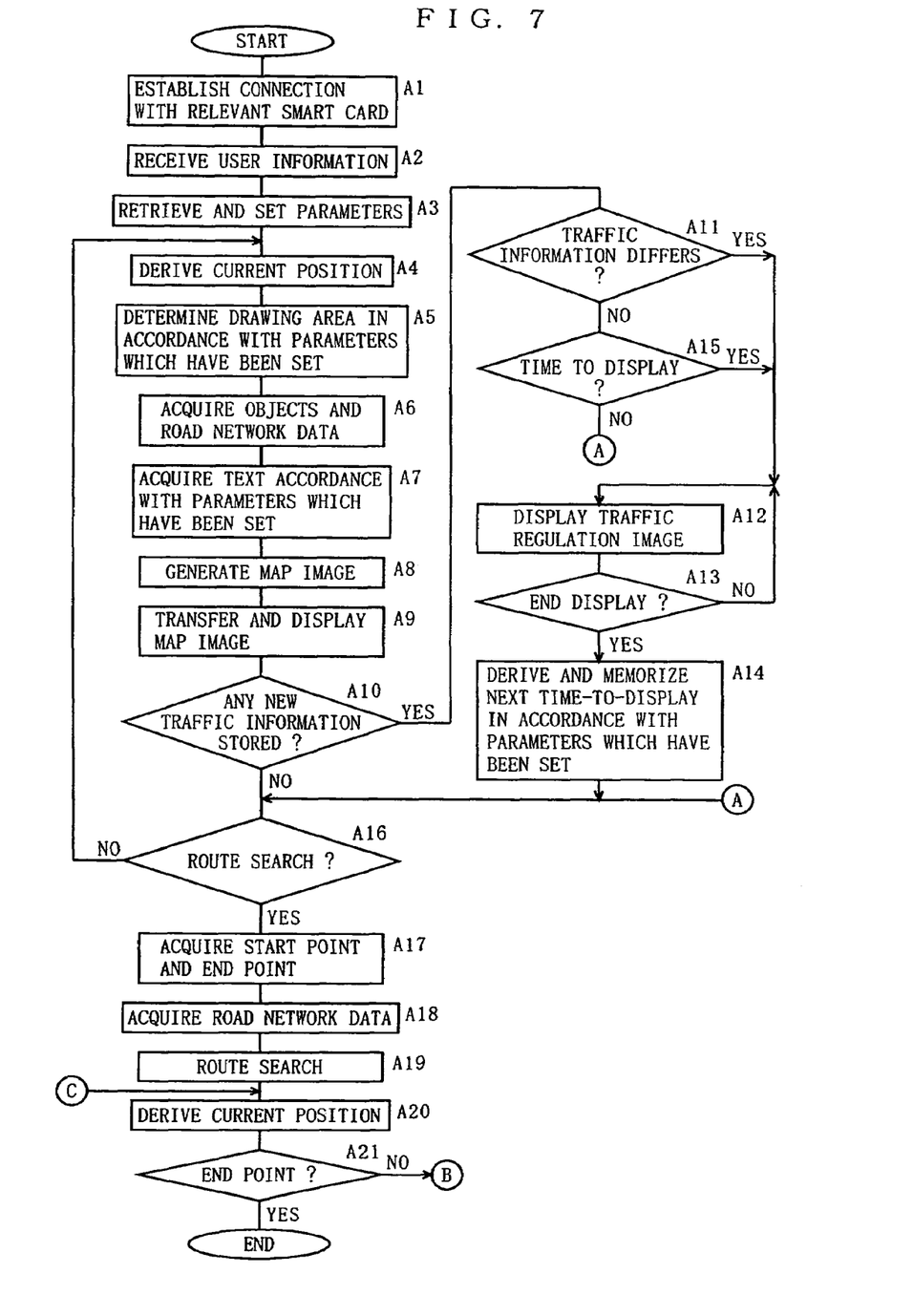
FIG. 7 is a flowchart illustrating a first half of a procedure of providing navigation guidance for a vehicle with the navigation system 1 shown in FIG. 1.

Next, referring to the flowcharts of FIG. 7 and FIG. 8, a manner in which the above-described navigation system 1 provides navigation guidance for a vehicle will be described. First, a driver sits at the driver's seat in a vehicle, and causes the navigation system 1 to be turned on. As a result, the control section 37 begins executing the program 361 stored in the program storage section 36. Thereafter, under the control of the control section 37, the user information communicating section 31 in the main apparatus 3 identifies a smart card 2 that gives the strongest received signal level, and establishes connection with the user information communicating section 23 in the smart card 2 thus identified (step A1).

Next, the control section 37 generates information (hereinafter referred to as a "transmission request") for requesting a date of birth (as an example of user information Da) from the smart card 2, and sends the transmission request to the smart card 2 via the user information communicating section 31. At the smart card 2, the control section 22 receives the transmission request via the user information communicating section 23, and in response, reads the user information Da from the storage medium 21 and transmits the user information Da to the main apparatus 3 via the user information communicating section 23. At the main apparatus 3, the control section 37 receives the user information Da via the user information communicating section 31 (step A2).

Next, at step A3, the control section 37 calculates the age of the driver from the received user information Da, and thereafter determines whether the calculated age is equal to or greater than the threshold age Y1. If it is determined that the calculated age is not equal to or greater than the threshold age Y1, the control section 37 retrieves, from the parameter table TPM, the combination of the X-direction distance La1 and the Y-direction distance Lb1, the sound volume level V1, the switching period F1, the stipulated importance degree DL1, and the outputting distance TP1 associated with the outputting of intersection information. Thereafter, the control section 37 sets the combination of the X-direction distance La1 and the Y-direction distance Lb1, the switching period F1, the stipulated importance degree DL1, and the outputting distance TP1 associated with the outputting of intersection information in a storage area reserved within its internal RAM, and further outputs the sound volume level V1 to the audio output section 39.

If it is determined at step A3 that the calculated age is equal to or greater than the threshold age Y1, the control section 37 retrieves, from the parameter table TPM, the combination of the X-direction distance La2 and the Y-direction distance Lb2, the sound volume level V2, the switching period F2, the stipulated importance degree DL2, and the outputting distance TP2 associated with the outputting of intersection information. Thereafter, the control section 37 sets the combination of the X-direction distance La2 and the Y-direction distance Lb2, the switching period F2, the stipulated importance degree DL2, and the outputting distance TP2 associated with the outputting of intersection information to the storage area reserved within its internal RAM. Furthermore, the control section 37 outputs the retrieved sound volume level V2 to the audio output section 39 (step A3).

Next, the control section 37 obtains the current location of the vehicle as acquired by means of the locator 34, and corrects the acquired current location of the vehicle with the velocity and direction of movement of the vehicle, thereby deriving the precise current location of the vehicle (step A4).

Next, from the current location of the vehicle which has been derived at step A4 and either the combination of the X-direction distance La1 and the Y-direction distance Lb1 and the combination of the X-direction distance La2 and the Y-direction distance Lb2 which has been set at step A3 (see FIG. 5), the control section 37 derives the coordinate values of the characteristic points of an map image to be currently drawn (step A5). As used herein, the "characteristic points"

refer to the four corners of a rectangular-shaped map image. Since the position at which the current location of the vehicle is to be superimposed on such an map image is predetermined, the coordinate values of the characteristic points can easily be calculated. In the following description, a rectangular area defined by the current location and the four corners derived from the X-direction distance La1 and the Y-direction distance Lb1 will be referred to as a "drawing area RA1"; and a rectangular area defined by the current location and the four corners derived from the X-direction distance La2 and the Y-direction distance Lb2 will be referred to as a "drawing area RA2".

Next, the control section 37 acquires all objects and road network data necessary for generating a map image corresponding to the drawing area RA1 or RA2 as derived at step A5 from the cartographic database DBa in the cartographic data storage section 32 (step A6).

Next, in accordance with the stipulated importance degree DL1 or DL2 which has been set at step A3, the control section 37 acquires text which is necessary for the generation of the map image from the character database DBb in the cartographic data storage section 32 (step A7). Specifically, if it has been determined at step A3 that the driver's age is less than the threshold age Y1, the primary information set ISa and the secondary character set ISb are retrieved. If not, only the primary information set ISa is retrieved.

Figure 9:
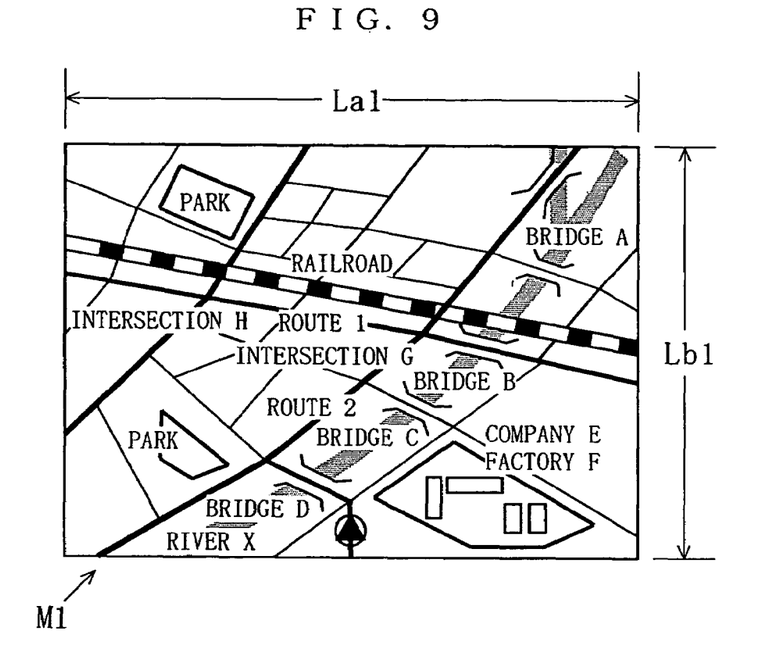
FIG. 9 is a schematic diagram illustrating an exemplary map image M1 generated at step A8 in FIG. 7.
Figure 10:
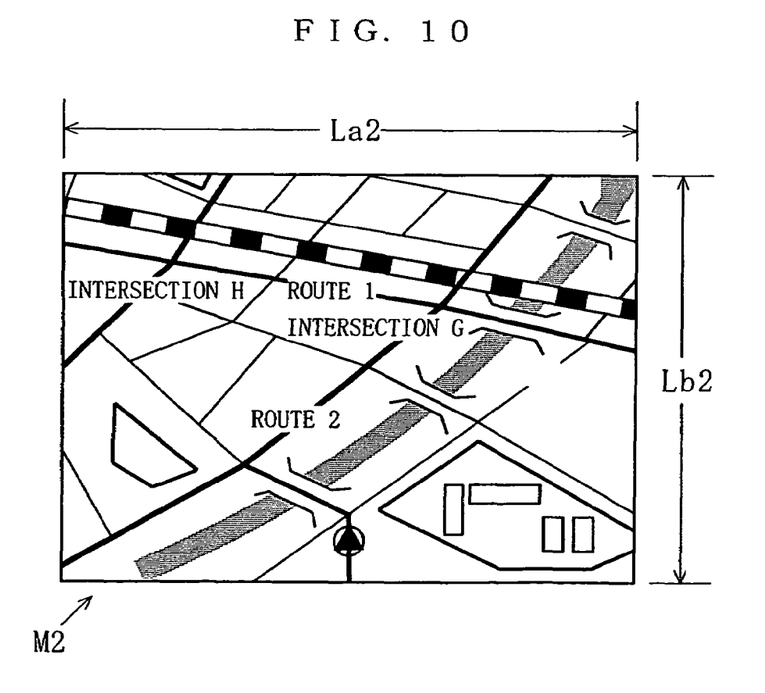
FIG. 10 is a schematic diagram illustrating an exemplary map image M2 generated at step A8 in FIG. 7.

Next, by using the objects and road network data having been acquired at step A6, as well as the primary information set ISa and the secondary character set ISb or the primary information set ISa alone having been retrieved at step A7, the control section 37 generates either a map image M1 or M2 having a predetermined pixel size (step A8). More specifically, if it is determined that the driver's age is less than the threshold age Y1, the control section 37 draws an image by using all objects and road network data contained in the relatively broad drawing area RA1, superimposes the text contained in the primary information set ISa and the secondary character set ISb at predetermined superimposed positions, and superimposes a mark indicating the vehicle at the current location having been derived at step A4, thereby generating a map image M1 as shown in FIG. 9. If it is determined that the driver's age is equal to or older than the threshold age Y1, the control section 37 draws an image by using all objects and road network data contained in the relatively narrow drawing area RA2, superimposes the text contained in the primary information set ISa at predetermined superimposed positions, and superimposes a mark indicating the vehicle at the current location which has been derived at step A4, thereby generating a map image M2 as shown in FIG. 10.

Although the drawing area RA2 is narrower than the drawing area RA1, the map images M1 and M2 have the same pixel size. In other words, the map image M2 is a magnified representation of a relatively narrow area. Moreover, only the names of intersections and names of roads, which are considered as relatively important are superimposed on the map image M2. Thus, the map image M2, which is very helpful to elderly people, is presented.

Referring back to FIG. 7, following step A8, the control section 37 transfers the generated map image M1 or M2 to the display section 38, and the display section 38 displays the received map image M1 or M2 (step A9).

As described earlier, the traffic information receiving section 35 typically stores (in the case where traffic information Db from the VICS is received) the received information to the control section 37. Following step A9, the control section 37 determines whether any new traffic information Db has been stored or not (step A10). If any new traffic information Db is found stored, the control section 37 determines whether the currently-stored traffic information Db differs from the previous traffic information Db or not (step A11). If the currently-stored traffic information Db is determined to be different (indicative of the existence of a new traffic regulation in the present embodiment), the control section 37 generates from the current traffic information Db a traffic regulation image RI representing the currently-existing traffic regulation, as shown in FIG. 6, and transfers it to the display section 38. The display section 38 displays the received traffic regulation image RI (step A12).

As a result of step A12, the image displayed on the display section 38 switches from the currently-displayed map image M1 or M2 to the traffic regulation image RI as shown in FIG. 6. The control section 37 keeps transferring the traffic regulation image RI generated at step A12 to the display section 38 until a time to end display is reached (step A13). Once the time to end display is reached, the control section 37 acquires the current time, which is obtained from a timer (not shown), as the time at which the displaying of the traffic regulation image RI was completed (hereinafter referred to as the "display-completed time"). Furthermore, the control section 37 adds the switching period F1 or F2 (which has been set at step A3) to the acquired display-completed time, and derives and memorizes a time at which to next display the traffic regulation image RI (hereinafter referred to as "next time-to-display") Tnx (step A14). The next time-to-display Tnx is used for the time-to-display derivation at step A15 described later.

If step A11 finds that the newly stored traffic information Db does not differ from the previous traffic information Db, it is determined whether it is the time to display the traffic regulation image RI or not (step A15). More specifically, step A15 determines whether the current time is past the currently memorized next time-to-display Tnx or not. If the current time is past the next time-to-display Tnx, the control section 37 performs step A12.

Through the above processes, the traffic regulation image RI corresponding to any non-differing traffic information Db will be outputted at each next time-to-display Tnx as calculated by using the switching period F1 or F2. Note that the value of the switching period F2 is set to be greater than that of the switching period F1. As a result, if the driver of the vehicle is relatively old, the frequency of switching the map image M2 to the traffic regulation image RI is comparatively reduced, thereby providing navigation guidance for the vehicle in a manner generally favorable to elderly people.

If step A10 finds that no new traffic information Db has been stored, or after step A14 has been executed, or if step A15 finds that it is not time to display traffic information RI, the control section 37 determines whether or not to perform a route search by a well-known technique (step A16). If it is determined that no route search is to be performed, the control section 37 returns to step A4.

On the other hand, if it is determined that a route search is to be performed, the control section 37 acquires a start point and an end point necessary for the route search by a well-known technique (step A17). Thereafter, the control section 37 acquires road network data which is necessary for the route search from the cartographic database DBa stored in the cartographic data storage section 32 (step A18). Thereafter, using the acquired road network data, the control section 37 searches for a route which enables the vehicle to travel from the start point to the end point as set at step A17 in the shortest amount of time or over the shortest distance (step A19).

Next, in a manner similar to step A4, the control section 37 derives the current location of the vehicle (step A20). Thereafter, the control section 37 determines whether or not the current location derived at step A20 coincides with the end point acquired at step A17 (step A21). If they coincide, the main apparatus 3 has successfully guided the vehicle to the end point, and therefore the processes of FIG. 7 and FIG. 8 are over.

Figure 8:
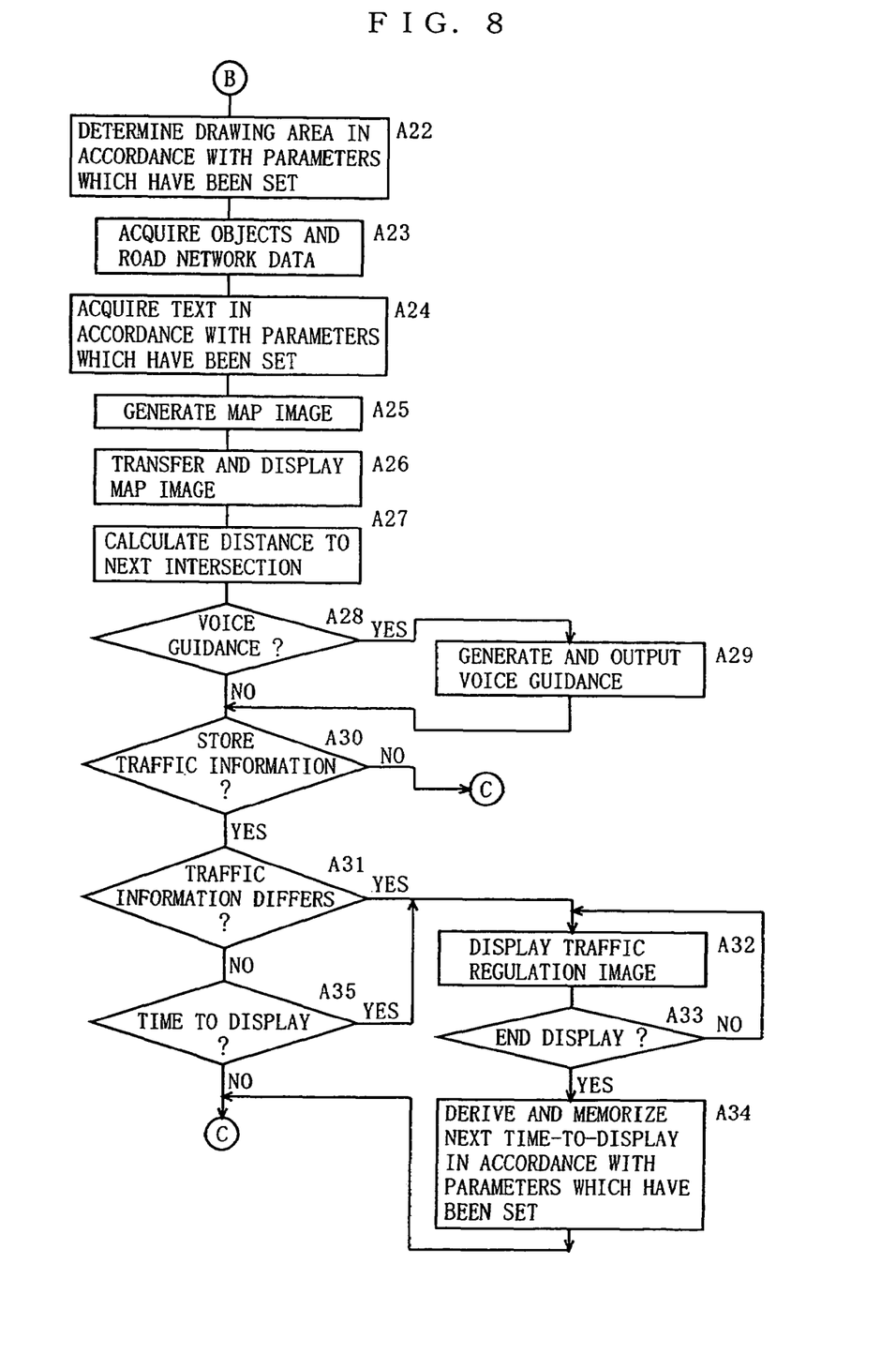
FIG. 8 is a flowchart illustrating a second half of a procedure of providing navigation guidance for a vehicle with the navigation system 1 shown in FIG. 1.

On the other hand, if step A21 finds that the current location does not coincide with the end point, the control section 37 derives a drawing area RA1 or RA2 by using the current location derived at step A20, through a similar method to step A5, (FIG. 8; step A22). Thereafter, in a manner similar to step A6, the control section 37 acquires all objects necessary for generating a map image corresponding to the derived drawing area RA1 or RA2 from the cartographic data storage section 32 (step A23). Note that it is unnecessary to read the road network data from the cartographic data storage section 32 at step A22 because it has already been acquired at step A18. Furthermore, in a manner similar to step A7, the control section 37 acquires text necessary for the generation of the map image from the cartographic data storage section 32 in accordance with the stipulated importance degree DL1 or DL2 (step A24).

Figure 11:
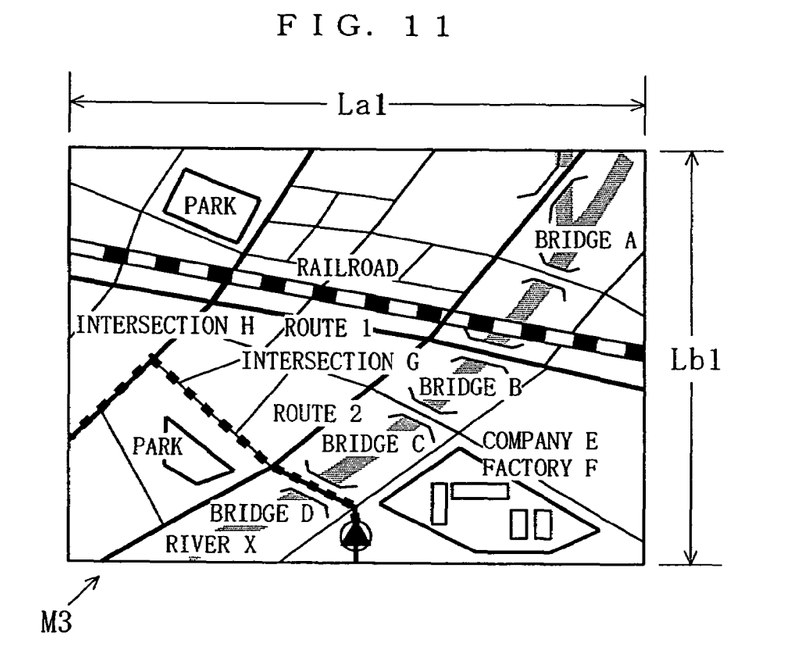
FIG. 11 is a schematic diagram illustrating an exemplary map image M3 generated at step A25 in FIG. 8.
Figure 12:
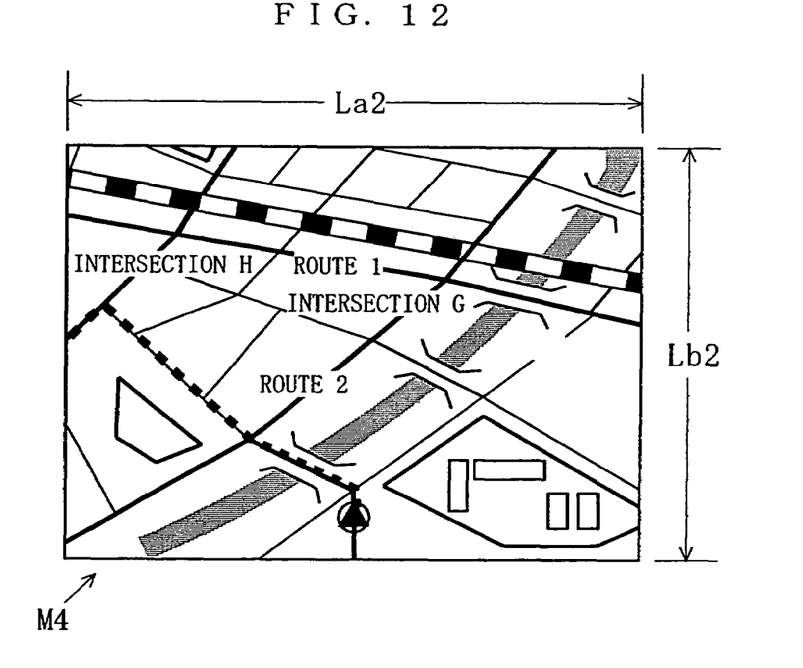
FIG. 12 is a schematic diagram illustrating an exemplary map image M4 generated at step A25 in FIG. 8.

Next, the control section 37 generates a map image M3 or M4 having the same pixel size as that of the map image M1 or M2 (step A25). More specifically, if it has been determined that the driver's age is less than the threshold age Y1, the control section 37 superimposes a portion of the route derived at step A19 that is contained within the drawing area RA1 on an image similar to the map image M1, thereby generating the map image M3 as shown in FIG. 11. On the other hand, if it has been determined that the driver is equal to or older than the threshold age Y1, the control section 37 superimposes a portion of the route derived at step A19 that is contained within the drawing area RA2 on an image similar to the map image M2, thereby generating the map image M4 as shown in FIG. 12.

Next, the control section 37 transfers the generated map image M3 or M4 to the display section 38, and the display section 38 displays the received map image M3 or M4 (step A26). Although the drawing area RA2 is narrower than the drawing area RA1, the map images M3 and M4 have the same pixel size. In other words, the map image M4 is a magnified representation of a relatively narrow area. Moreover, only the names of intersections and names of roads, which are considered as relatively important are superimposed on the map image M4. Thus, the map image M4, which is very helpful to elderly people, is presented.

Next, by using the route derived at step A19, the control section 37 calculates a distance D3 from the current location derived at step A20 to an intersection which will be next passed by the vehicle (step A27). Thereafter, the control section 37 determines whether or not to provide a voice guidance (step A28). Specifically, if the distance D3 calculated at step A27 is equal to or less than the outputting distance TP1 or TP2 which has been set at step A3, the control section 37 determines that the vehicle is about to approach the intersection, and generates a synthesized voice which directs the driver to "go straight", "turn right at", or "turn left at" the next intersection as mentioned above, and transfers it to the audio output section 39. The audio output section 39 outputs the content expressed by the received synthesized voice at the sound volume level V1 or V2 which has been set by the control section 37 at step A3 (step A29).

As will be clear from the above, if the driver of the vehicle is relatively old, sound volume level of the output of the audio output section 39 is made comparatively high, and the voice guidance is outputted at a position comparatively distant from an intersection, thereby providing navigation guidance for the vehicle in a manner generally favorable to elderly people.

If step A28 finds that the distance D3 is not equal to or less than the outputting distance TP1 or TP2, or after step A29 has been executed, the control section 37 determines whether or not any new traffic information Db has been stored, in a manner similar to step A10 (step A30). If any new traffic information Db is found stored, in a manner similar to step A11, the control section 37 determines whether the currently-stored traffic information Db differs from the previous traffic information Db or not (step A31).

If the currently-stored traffic information Db is determined to be different, the control section 37 generates a traffic regulation image RI in a manner similar to step A12, and causes it to be displayed by the display section 38 (step A32). As a result, the image displayed on the display section 38 switches from the currently-displayed map image M3 or M4 to the traffic regulation image RI. The control section 37 keeps transferring the traffic regulation image RI generated at step A32 to the display section 38 until a predetermined time to end display is reached (step A33). Once the time to end display is reached, in a manner similar to step A14, the control section 37 derives and memorizes a next time-to-display Tnx, which is used at step A35 described later (step A34).

On the other hand, if step A31 finds that the newly stored traffic information Db does not differ from the previous traffic information Db, the control section 37 determines whether it is time to display the traffic regulation image RI or not in a manner similar to step A15 (step A35), and performs step A32 if it is time to display the traffic regulation image RI.

Through the above processes, the traffic regulation image RI corresponding to any non-differing traffic information Db will be outputted at each next time-to-display Tnx as calculated by using the switching period F1 or F2. Note that the value of the switching period F2 is set to be greater than that of the switching period F1. As a result, if the driver of the vehicle is relatively old, the frequency of switching the map image M4 to the traffic regulation image RI is comparatively reduced, thereby providing navigation guidance for the vehicle in a manner generally favorable to elderly people.

If step A31 finds that no new traffic information Db has been stored, or after step A34 has been executed, or if step A35 finds that it is not time to display traffic information RI, the control section 37 returns to step A20.

Although the above description illustrates a preferable embodiment where the storage medium 21 is internal to the smart card 2, the present invention is not limited thereto. Alternatively, the smart card 2 may itself be a removable storage medium, such as an SD card (R). Note that, since such a removable medium is not capable of performing wireless communications with the main apparatus 3, the main apparatus 3 will need to comprise a reader for reading information from the removable medium, instead of the user information communicating section 31.

Although the above description illustrates a preferable embodiment directed to a main apparatus 3 which is mountable on a vehicle, the present invention is not limited thereto. Alternatively, the main apparatus 3 may be implemented in a mobile configuration, e.g., a personal computer, a mobile phone, or a PDA (Personal Digital Assistant).

Although the above description illustrates a preferable embodiment where wireless communications are conducted with the smart card 2 that gives the strongest received signal level while disposing the user information communicating section 31 in the main apparatus 3 at the closest position to the driver's seat, the present invention is not limited thereto. Alternatively, the smart card 2 to conduct wireless communications with may be identified in the following manner. A piece of information stored in the storage medium 21 that identifies a person who may drive the vehicle (typically a combination of a surname and other (first) names) is registered in the main apparatus 3; the main apparatus 3 wirelessly communicates with a number of smart cards 2 around itself to acquire the combination of a surname and other (first) names of each bearer; then, the main apparatus 3 conducts wireless communications with one of the smart cards 2 that has transmitted a combination of a surname and other (first) names that coincide with a preregistered combination of a surname and other (first) names.

The above embodiment illustrates an example where the main apparatus 3 derives the driver's age from the driver's date of birth (as an example of user information Da), and controls the outputting of the various information which is necessary for providing navigation guidance for the vehicle; however, the present invention is not limited thereto. It may be possible to derive the driver's driving career from the date of issue of an electronic driver's license (as another example of user information Da), and the main apparatus 3 may control the outputting of the various information which is necessary for providing navigation guidance for the vehicle by using the driving career thus derived.

The above embodiment illustrates an example where the outputting of the various information which is necessary for providing navigation guidance for the vehicle is controlled based on whether or not the driver is equal to or older than the threshold age Y1; however, the present invention is not limited thereto. Two or more threshold ages may be employed.

The above embodiment illustrates an example where traffic regulation image RI is displayed at step A12 or A32. However, the traffic information Db contains various other information. Therefore, at step A12 or A32, an image which is generated from any arbitrary piece of information contained in the traffic information Db may be displayed.

The above embodiment illustrates an example where, combinations of X-direction distances and Y-direction distances, sound volume levels, switching periods, stipulated importance degrees and outputting distances associated with the outputting of intersection information are described in the parameter table storage section 33; however, the present invention is not limited thereto. Any parameter for controlling the outputting of the various information which is necessary for providing navigation guidance for the vehicle may be described in the parameter table TPM. Examples of other parameters include the tone and brightness of the image outputted by the display section 38.

The above embodiment illustrates an example where, the cartographic data storage section 32 stores the character database DBb as a collection of text which is superimposable on a map image; however, the present invention is not limited thereto. The cartographic data storage section 32 may store a database of landmark images and/or symbol marks which are superimposable on map images. Such landmark images or symbol marks will be classified depending on degrees of importance, in the same manner that text is classified. As in the case of text, the control section 37 will acquire only necessary landmark images and/or symbol marks, and generates a map image using the acquired landmark images and/ or symbol marks.

The above embodiment illustrates an example where the control section 37 generates two-dimensional map images M1 to M4; however, the present invention is not limited thereto. Three-dimensional map images may be generated instead.

While the invention has been described in detail, the foregoing description is in all aspects illustrative and not restrictive. It is understood that numerous other modifications and variations can be devised without departing from the scope of the invention.

What is claimed is:

1. A navigation system comprising:
a storage medium operable to store user information;
a parameter storage section operable to store one or more parameters used for controlling a presentation of information necessary for providing navigation guidance for an entity;
a parameter acquisition section operable to acquire at least one parameter from the parameter storage section based on the user information stored in the storage medium;
an information generation section operable to generate information necessary for providing navigation guidance for the entity and for arranging a presentation of the information being generated in accordance with the at least one parameter acquired by the parameter acquisition section;
a traffic information receiving section operable to receive traffic information representing a current traffic situation in a road network; and
an output section operable to output the information generated by the information generation section, wherein
the parameter storage section stores at least one parameter for each range of a plurality of predetermined ranges of age or length of driving career, and
the at least one parameter includes a switching period for switching to the traffic information received by the traffic information receiving section.

2. The navigation system according to claim 1, wherein,
the storage medium is comprised in a smart card, and
the parameter storage section, the parameter acquisition section, the information generation section, and the output section are comprised in a main apparatus.

3. The navigation system according to claim 2, wherein,
the entity is a vehicle,
the user information stored in the storage medium is an age of a bearer of an electronic driver's license, and
the parameter acquisition section acquires, from the parameter storage section, a set of parameters associated with the age range within which falls the age stored in the storage medium or a length of driving career calculable from a date of issue stored in the storage medium.

4. The navigation system according to claim 3, further comprising:
a cartographic data storage section operable to store a plurality of objects and road network data necessary for drawing a map image which is substantially rectangular-shaped, the road network data representing interconnections between roads on a map,
wherein,
the parameter storage section stores, for each range of the plurality of predetermined ranges of age or length of driving career, a combination of X-direction and Y-direction distances delimiting a maximum scale of the map image to be drawn,
the parameter acquisition section acquires, from the parameter storage section, a combination of X-direction and Y-direction distances associated with the age range or length of driving career range within which falls the age stored in the storage medium or the length of driving career calculable from the date of issue stored in the storage medium, and the information generation section comprises:

an object/road network data acquisition section operable to acquire, from the cartographic data storage section, necessary objects and road network data for generating a map image of a scale delimited by the combination of X-direction and Y-direction distances acquired by the parameter acquisition section; and a map image generation section operable to generate a map image by using the objects and road network data acquired by the object/road network data acquisition section, the generated map image having a scale delimited by the combination of X-direction and Y-direction distances, wherein the output section outputs the map image generated by the map image generation section as information.

5. The navigation system according to claim 4, wherein, the cartographic data storage section further stores, for each of a plurality of predetermined degrees of importance, information superimposable on the map image to be drawn, the parameter storage section further stores, for each range of the plurality of predetermined ranges of age or length of driving career, a degree of importance assigned to information to be superimposed on the map image to be drawn, the parameter acquisition section further acquires, from the parameter storage section, a degree of importance associated with the range within which falls the age stored in the storage medium or a length of driving career calculable from the date of issue stored in the storage medium, the information generation section further comprises an information acquisition section operable to acquire, from the cartographic data storage section, information associated with the degree of importance acquired by the parameter acquisition section, and the map image generation section generates the map image so as to selectively present information in accordance with the acquired information associated with the degree of importance.

6. The navigation system according to claim 3, wherein, the parameter acquisition section acquires, from the parameter storage section, a switching period associated with the range within which falls the age stored in the storage medium or the length of driving career calculable from the date of issue stored in the storage medium, the information generation section comprises a display timing determination section operable to determine whether a time to display information has been reached or not based on the switching period acquired by the parameter acquisition section, and if the display timing determination section determines that the time to display information has been reached, the output section displays the traffic information received by the traffic information receiving section as information.

7. The navigation system according to claim 3, further comprising:

a cartographic data storage section operable to store at least road network data representing interconnections between roads on a map, a route search section operable to search for a route from a designated start point to a designated end point by using the road network data stored in the cartographic data storage section, wherein, the parameter storage section further stores, for each range of the plurality of predetermined ranges of age or length of driving career, a sound volume level at which to provide a voice navigation guidance for the entity in accordance with the route searched for by the route search section, and an outputting distance from a navigation event in advance of which the voice guidance is outputted, the parameter acquisition section further acquires, from the parameter storage section, a sound volume level and an outputting distance associated with the age stored in the storage medium or a length of driving career calculable from the date of issue stored in the storage medium, and the information generation section comprises:

a voice guidance determination section operable to determine whether a time to output the voice guidance has been reached or not based on the outputting distance acquired by the parameter acquisition section, and a voice guidance generation section operable to generate the voice guidance when the voice guidance determination section determines that the time to output the voice guidance has been reached, wherein the output section outputs the voice guidance generated by the voice guidance generation section as information in accordance with the sound volume level acquired by the parameter acquisition section.

8. A navigation method for providing navigation guidance for an entity, by using user information and one or more parameters used for controlling a presentation of information necessary for providing the navigation guidance, comprising:

acquiring user information;

acquiring at least one parameter based on the acquired user information generating information necessary for providing the navigation guidance for the entity and arranging a presentation of the information being generated in accordance with the at least one acquired parameter; and outputting the generated information, wherein the at least one acquired parameter is a switching period for switching to traffic information received by a traffic information receiving section.

9. The navigation method according to claim 8, wherein the method is implemented by a computer program.

10. The navigation method according to claim 9, wherein the computer program is recorded in a storage medium.

11. A navigation system comprising:

a storage medium operable to store user information;

a parameter storage section operable to store one or more parameters used for controlling the presentation of information necessary for providing navigation guidance for an entity;

a parameter acquisition section operable to acquire at least one parameter from the parameter storage section based on the user information stored in the storage medium;

an information generation section operable to generate information necessary for providing navigation guidance for the entity and for determining an amount of information to be included in the presentation of the information being generated in accordance with the at least one parameter acquired by the parameter acquisition section;

a traffic information receiving section operable to receive traffic information representing a current traffic situation in a road network; and an output section for outputting the information generated by the information generation section, wherein the parameter storage section stores at least one parameter for each range of a plurality of predetermined ranges of age or length of driving career, and the at least one parameter includes a switching period for switching to the traffic information received by the traffic information receiving section.

12. The navigation system according to claim 11, wherein, the storage medium is comprised in a smart card, and the parameter storage section, the parameter acquisition section, the information generation section, and the output section are comprised in a main apparatus.

13. The navigation system according to claim 11, wherein, the entity is a vehicle, the user information stored in the storage medium is an age of a driver of the vehicle, and the parameter acquisition section acquires, from the parameter storage section, a set of parameters associated with the age range within which falls the age stored in which the storage medium or a length of driving career calculable from a date of issue stored in the storage medium.

14. The navigation system according to claim 13, further comprising:

a cartographic data storage section operable to store a plurality of objects and road network data necessary for drawing a map image which is substantially rectangular-shaped, the road network data representing interconnections between roads on a map, wherein, the parameter storage section stores, for each range of the plurality of predetermined ranges of age or length of driving career, a combination of X-direction and Y-direction distances delimiting a maximum scale of the map image to be drawn, the parameter acquisition section acquires, from the parameter storage section, a combination of X-direction and Y-direction distances associated with the age range or length of driving career range within which falls the age stored in the storage medium or the length of driving career calculable from the date of issue stored in the storage medium, and the information generation section comprises:

an object/road network data acquisition section operable to acquire, from the cartographic data storage section, necessary objects and road network data for generating a map image of a scale delimited by the combination of X-direction and Y-direction distances acquired by the parameter acquisition section; and a map image generation section operable to generate a map image by using the objects and road network data acquired by the object/road network data acquisition section, the generated map image having a scale delimited by the combination of X-direction and Y-direction distances, wherein the output section outputs the map image generated by the map image generation section as information.

15. The navigation system according to claim 14, wherein, the cartographic data storage section further stores, for each of a plurality of predetermined degrees of importance, information superimposable on the map image to be drawn, the parameter storage section further stores, for each range of the plurality of predetermined ranges of age or length of driving career, a degree of importance assigned to information to be superimposed on the map image to be drawn, the parameter acquisition section further acquires, from the parameter storage section, a degree of importance associated with the range within which falls the age stored in the storage medium or a length of driving career calculable from the date of issue stored in the storage medium, the information generation section further comprises an information acquisition section operable to acquire, from the cartographic data storage section, information associated with the degree of importance acquired by the parameter acquisition section, and the map image generation section generates the map image so as to selectively present information in accordance with the acquired information associated with the degree of importance.

16. The navigation system according to claim 13, wherein, the parameter acquisition section acquires, from the parameter storage section, a switching period associated with the range within which falls the age stored in the storage medium or the length of driving career calculable from the date of issue stored in the storage medium, the information generation section comprises a display timing determination section operable to determine whether a time to display information has been reached or not based on the switching period acquired by the parameter acquisition section, and if the display timing determination section determines that the time to display information has been reached, the output section displays the traffic information received by the traffic information receiving section as information.

17. The navigation system according to claim 13, further comprising:

a cartographic data storage section operable to store at least road network data representing interconnections between roads on a map, a route search section operable to search for a route from a designated start point to a designated end point by using the road network data stored in the cartographic data storage section, wherein, the parameter storage section further stores, for each range of the plurality of predetermined ranges of age or length of driving career, a sound volume level at which to provide a voice navigation guidance for the entity in accordance with the route searched for by the route search section, and an outputting distance from a navigation event in advance of which the voice guidance is outputted, the parameter acquisition section further acquires, from the parameter storage section, a sound volume level and an outputting distance associated with the age stored in the storage medium or a length of driving career calculable from the date of issue stored in the storage medium, and the information generation section comprises:

a voice guidance determination section operable to determine whether a time to output the voice guidance has been reached or not based on the outputting distance acquired by the parameter acquisition section, and a voice guidance generation section operable to generate the voice guidance when the voice guidance determination section determines that the time to output the voice guidance has been reached, wherein the output section outputs the voice guidance generated by the voice guidance generation section as information in accordance with the sound volume level acquired by the parameter acquisition section.

18. The navigation system according to claim 11, further comprising:

a route search section operable to search for a route from a designated start point to a designated end point, wherein, for a given route, the amount of information to be included in the presentation of the information being generated differs based on the user information stored in the storage medium.

19. The navigation system according to claim 18, wherein the user information stored in the storage medium represents an age or a length of driving career.

20. The navigation system according to claim 1, further comprising:

a route search section operable to search for a route from a designated start point to a designated end point, wherein, for a given route, the presentation of the information being generated differs based on the user information stored in the storage medium.

21. The navigation system according to claim 20, wherein the user information stored in the storage medium represents an age or a length of driving career.

22. A navigation system comprising:

a storage medium operable to store user information;

a parameter storage section operable to store one or more parameters used for controlling a presentation of information necessary for providing navigation guidance for an entity;

a parameter acquisition section operable to acquire at least one parameter from the parameter storage section based on the user information stored in the storage medium;

an information generation section operable to generate information necessary for providing navigation guidance for the entity and for arranging a presentation of the information being generated in accordance with the at least one parameter acquired by the parameter acquisition section;

a cartographic data storage section operable to store a plurality of objects and road network data necessary for drawing a map image which is substantially rectangular-shaped, the road network data representing interconnections between roads on a map;

a map image generation section operable to generate a map image by using the objects and road network data, and an output section operable to output the information generated by the information generation section, wherein the cartographic data storage section stores, for each range of a plurality of predetermined ranges of age or length of driving career, a degree of importance assigned to information to be superimposed on the map image to be drawn, and the map image generation section generates the map image so as to selectively present information having a degree of importance satisfying the degrees of importance stored for each range of the plurality of predetermined ranges of age or length of driving career.

* * * * *